No. 724,829. PATENTED APR. 7, 1903.
C. A. EBERTH.
COMBINED LIME SQUEEZER AND ICE TONGS.
APPLICATION FILED FEB. 3, 1903.
NO MODEL.
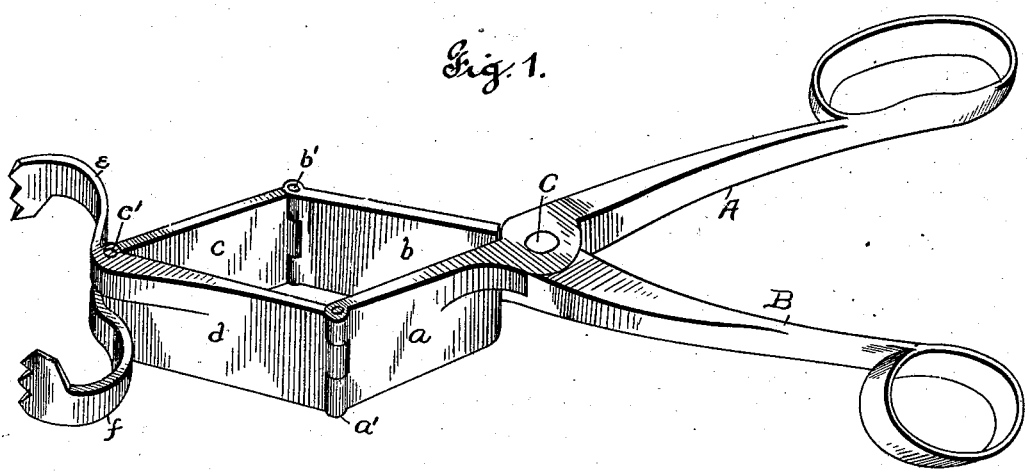
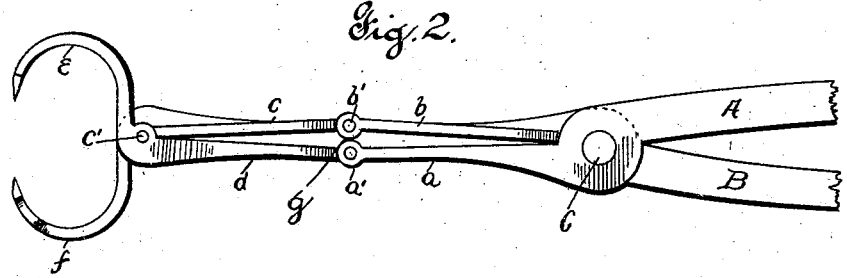
Witnesses
Inventor
Chas. A. Eberth
by Higdon & Longan & Hopkins
attys

UNITED STATES PATENT OFFICE.

CHARLES A. EBERTH, OF ST. LOUIS, MISSOURI.

COMBINED LIME-SQUEEZER AND ICE-TONGS.

SPECIFICATION forming part of Letters Patent No. 724,829, dated April 7, 1903.

Application filed February 3, 1903. Serial No. 141,769. (No model.)

*To all whom it may concern:*

Be it known that I, CHARLES A. EBERTH, of the city of St. Louis, State of Missouri, have invented certain new and useful Improvements in a Combined Lime-Squeezer and Ice-Tongs, of which the following is a full, clear, and exact description, reference being had to the accompanying drawings, forming a part hereof.

My object is to provide a combined lime-squeezer and ice-tongs; and my invention consists of the novel features hereinafter shown, described, and claimed.

Figure 1 is a perspective of a combined lime-squeezer and ice-tongs embodying my invention, the jaws of the lime-squeezer and the prongs of the ice-pick being open. Fig. 2 is a plan view of the said device, showing the jaws of the lime-squeezer and the prongs of the ice-pick in their closed position.

In the device of my invention the scissors-handles A and B terminate in the flat depending jaw-plates $a\ b$ and are pivotally connected together by the pin C. The jaw-plates $a\ b$ are pivotally connected to the jaw-plates $c\ d$ by means of pins $a'\ b'$. The jaw-plates $c\ d$ are pivotally connected by means of the pin $c'$ and are provided with the toothed members $e\ f$, which are curved in the form shown in the drawings.

The device of my invention is peculiarly adapted for use in the preparation of iced drinks, and particularly to that class of iced drinks in which lime-juice is used. As is well known in the art, the dispenser of such drinks is provided with blocks of ice approximately uniform in size and adapted to fit within the certain tall thin glasses which are used for the preparation of "rickeys" and the like. In order to handle such lumps of ice, an ice-tongs may be used in which the prongs do not come in contact with each other, but are spread apart even when closed, as shown in Fig. 2. In the preparation of such iced drinks it is customary in the art to first place the ice within the glass by means of the fingers of the operator or by a separate ice-tongs. The former practice is objectionable for obvious reasons, and the latter practice is objectionable because of the necessity of employing a separate instrument from that used in the next step in the preparation of the beverage, which consists in squeezing a portion of the lime so that its juice will fall into the glass. The operation of squeezing the lime is commonly performed, as is the handling of the ice, by the fingers of the operator or by the employment of a lime-squeezer, and each of these practices is objectionable upon the same grounds as the corresponding methods of handling the ice, which have been hereinbefore enumerated and criticized.

In order to overcome the loss of time incident to the use of separate tongs and lime-squeezers, and in order that the operation of placing the ice in the glass and squeezing the lime therein may be effected by successive operations of the same implement, and in order that both of these operations may be performed by the operator by the use of one hand only, I have devised my hereinbefore-described combination implement, the mode of operation whereof is as follows: The implement, being held in the hand of the operator, is manipulated by the pressure of the thumb and finger to the loops of the scissors-handles. The handles being first distended, the prongs $e\ f$ are also distended to admit of their being placed about the ice. The scissors-handles being brought together causes the prongs $e\ f$ to grasp the ice and the third and outward movement of the scissors-handles causes the ice to be released to drop into the glass. At this point the operator places the implement, whose jaw-plates $a\ b\ c\ d$ have been distended by the same operation which released the prongs $e\ f$ from the ice, about the section of lime to be squeezed, and sufficient pressure is administered to the handles A B to catch the lime and withdraw it from the receptacle from which it is to be taken. When the lime has been brought to a position above the mouth of the glass, still further pressure is exerted upon the handles A B to bring them toward each other, thus bringing the jaw-plates $a\ b\ c\ d$ toward each other and pressing the juice from the lime.

At the point of hinged connection between the jaw-plates $a\ b$ and the jaw-plates $c\ d$ I have so formed the plates in producing the hinge as to provide an inwardly-projecting ridge $g$ upon each side of the squeezing portion of my device. This ridge prevents the lime-section from slipping, holds it firmly in position, and assists in the effective extraction of the juice of the fruit.

I have thus produced a device which is capable of performing the two separate functions named successively by the use of one hand alone, which functions have hitherto been performed by hand or by the employment of two separate implements.

Having thus described my invention, what I claim as new, and desire to have secured to me by the grant of Letters Patent, is—

1. A combined ice-tongs and lime-squeezer, comprising four rectangular hinged jaw-plates arranged in pairs, the inner faces of each pair being directly opposed to each other, and one pair being hinged together by means of operating-handles, whereby the hinge of such handles becomes the operating center of such jaw-plates, the second pair of jaw-plates being hinged together and to the outer ends of the first pair; and curved prongs extending outwardly from the second pair of jaw-plates beyond their hinged connection to form an ice-tongs, substantially as set forth.

2. In a combined ice-tongs and lime-squeezer, a pair of operating crossed handles terminating in reinforcing-lugs, flat jaw-plates opposed to each other and secured respectively to the reinforcing-lugs of the handles, another pair of jaw-plates pivoted together at their outer ends and at their inner ends pivotally connected to the outer ends of the pair of jaws connected with the handles, and curved prongs extending outwardly from the second pair of jaw-plates beyond their hinged connection to form an ice-tongs, substantially as set forth.

In testimony whereof I affix my signature in presence of two witnesses.

CHARLES A. EBERTH.

Witnesses:
M. G. IRION,
ALFRED A. EICKS.